UNITED STATES PATENT OFFICE.

WILLIAM ANTONI, OF LODI, CALIFORNIA.

PROCESS OF MAKING VINEGAR.

No. 928,578.     Specification of Letters Patent.     Patented July 20, 1909.

Application filed October 6, 1908. Serial No. 456,496.

*To all whom it may concern:*

Be it known that I, WILLIAM ANTONI, a subject of the Emperor of Germany, residing at Lodi, in the county of San Joaquin and State of California, have invented certain new and useful Improvements in Methods of Making Vinegar, of which the following is a specification.

This invention relates to the manufacture of vinegar and has particular reference to an improved process of producing vinegar from wine, cider and like liquids in which vegetable or fruit extracts are present.

The production of vinegar from wine, cider and similar liquids containing appreciable amounts of extract is subject to the following disadvantages: The extract causes a heavy growth of acetic ferment, which results in the formation of a large deposit of insoluble matter, composed of dead ferment (mother of vinegar) as well as of extract matter rendered insoluble by the fermentative process. In the quick process this deposit settles on the beachwood shavings or other like material employed in the acetifiers, obstructs the passages and causes putrid fermentation and other troubles, which result in injury to the vinegar. In the slow or still process the vats are filled with a voluminous deposit and require frequent emptying and cleaning. In both processes the extract is furthermore favorable to the growth of mold and bacteria, which destroy or injure the product. Finally, in the case of the quick process especially, parts of the extract are easily converted into substances of disagreeable taste and odor, which make the product unsalable.

It is the purpose of my invention to overcome these disadvantages. My method is as follows: The extract is separated from the alcohol, the latter converted into vinegar and reunited with the extract to form wine-, cider-, and like vinegar.

In the practice of my process I subject the alcohol liquid to distillation, preferably under diminished atmospheric pressure, until a material part of the liquid has distilled over. Satisfactory results may be obtained by distilling over about one-half of the liquid. The distillate, which is free or practically free from vegetable or fruit extracts, is then converted into vinegar, after having been made up to a liquid suitable for acetic fermentation by the slow or preferably by the quick process. Finally the residue from the distillation and the acetified distillate are reunited whereupon the residue will be acetified by the slow process. It is not necessary, however, to thus compound extract and distillate, that belong together, but it may be more convenient to add the residue of one to the acetified distillate of a preceding distillation, which would obviate the necessity of storing the residue, while its distillate is being passed through the acetifiers.

This new process makes it possible to produce vinegar with a high amount of extract in less time than heretofore, and to avoid the troubles in its manufacture. At the same time the product is free from objectionable substances present in vinegar made by the quick process from liquids containing vegetable or fruit extracts.

Having described my invention, I claim:

1. The herein described process of making vinegar from wine, cider, or the like, which consists in subjecting the liquid employed to partial distillation, acetifying the distillate separately from the residue from the distillation, and acetifying the said residue by the action of an acetified distillate, substantially as described.

2. The herein described process of making vinegar from wine, cider, or the like, which consists in subjecting the liquid employed to partial distillation, acetifying the distillate by the quick process, and acetifying the residue from the distillation by the action of an acetified distillate.

3. The herein described process of making vinegar, from wine, cider, or the like, which consists in subjecting the liquid employed to partial distillation, acetifying the distillate separately from the residue from the distillation and uniting the resulting vinegar and the residue from the distillation.

4. The herein described process of making vinegar from wine, cider, or the like, which consists in subjecting the liquid employed to partial distillation, acetifying the distillate by the quick process, and uniting the resulting vinegar and the residue from the distillation.

5. The herein described process of making vinegar from wine, cider, or the like, which consists in subjecting the liquid employed to partial distillation under diminished atmospheric pressure, acetifying the distillate by the quick process and uniting the resulting vinegar and the residue from the distillation.

In testimony whereof I affix my signature in presence of two witnesses.

WILLIAM ANTONI.

Witnesses:
F. T. GREEN,
M. C. SHATTUCK.